Jan. 23, 1968 F. G. GEIL ET AL 3,365,680
TUNABLE NARROW BANDPASS MAGNETOSTRICTIVE FILTER WITH ELECTROSTRICTIVE DRIVE
Filed May 25, 1964
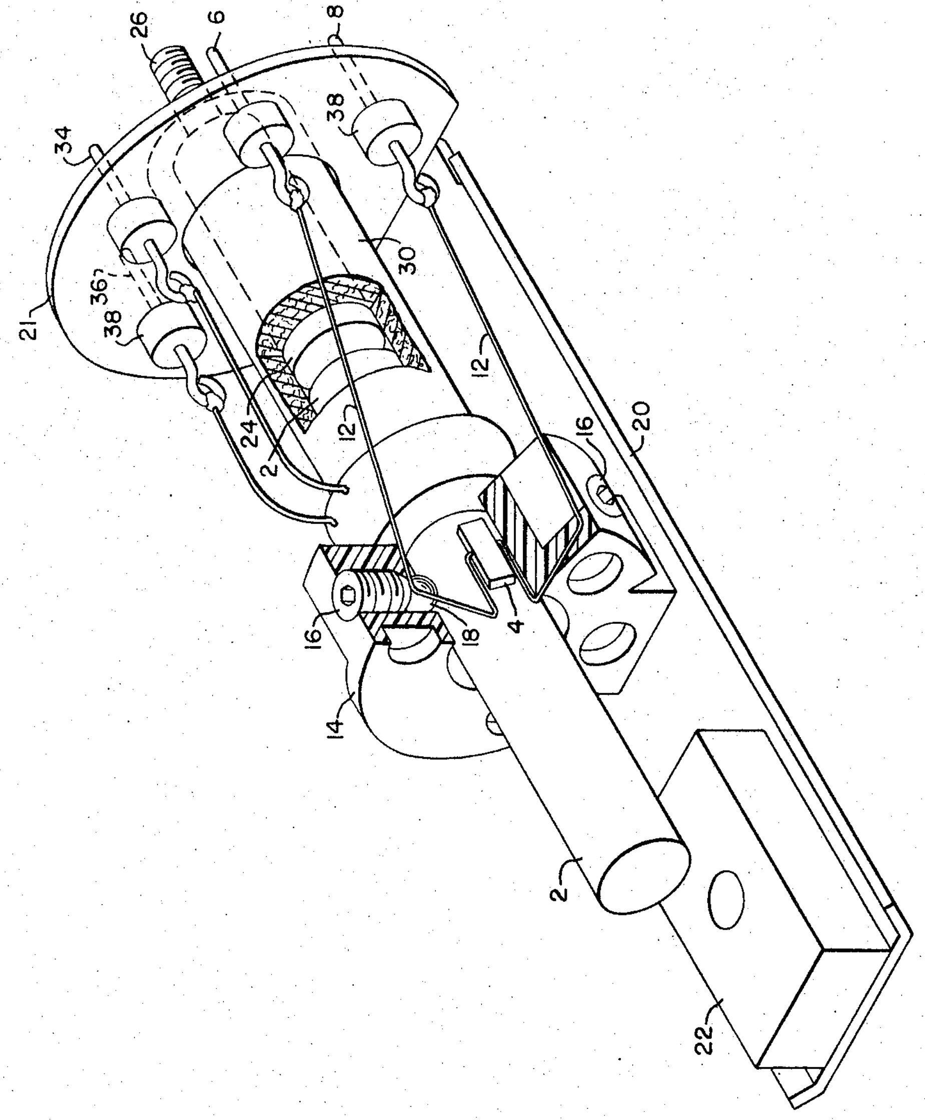
WITNESSES:
INVENTORS
Fred G. Geil, Floyd B. Craig
and Robert H. Whittaker.
BY

United States Patent Office 3,365,680
Patented Jan. 23, 1968

3,365,680

TUNABLE NARROW BANDPASS MAGNETOSTRICTIVE FILTER WITH ELECTROSTRICTIVE DRIVE

Fred G. Geil, Verona, Floyd B. Craig, Monroeville, and Robert H. Whittaker, Export, Pa., assignors to Westinghouse Electric Corporation, East Pittsburgh, Pa., a corporation of Pennsylvania Filed May 25, 1964, Ser. No. 369,952
1 Claim. (Cl. 333—71)

ABSTRACT OF THE DISCLOSURE

The present disclosure relates to a narrow bandpass electromechanical filter wherein an electrostrictive device is fixed to a magnetostrictive rod having a predetermined frequency, with the rod being supplied with a magnetic bias which may be adjusted to fine tune the resonant frequency of the rod. Input electrical signals are applied to the electrostrictive device so that the rod is driven mechanically thereby. An output coil is disposed about the rod to supply output signals therefrom whenever the input electrical signals are substantially of the resonant frequency of the rod.

The present invention relates to frequency sensitive devices, and more particularly to electromechanical filtering devices having a narrow passband.

Various types of electromechanical devices have been proposed for use as frequency sensitive filters. Various uses for such electromechanical devices are: comb filters, spectrum analyzers, range gating filters (for use in frequency modulated sonar) and similar devices requiring a narrow bandpass characteristic. In electromechanical filters of this type, electrical input signals are used to drive a mechanical resonator of the filter. An output circuit is responsive to vibrations in the mechanical portion of the filter and will provide a relatively high output signal when the input signals to the device are of the same frequency as the resonant frequency of the device.

A number of materials having different characteristics and operating through different mechanisms have been suggested for use in such electromechanical filtering devices. The principal ones of those selected have been: piezoelectric crystals, piezoelectric electrostrictive materials, magnetostrictive materials, including ferrites, and electrodynamically driven reeds. Each of the systems has advantages; however, there are also disadvantages to its usage. For example, because piezoelectric crystals have electrostatic coupling between the input and output circuits of the device, it is necessary to use bridge circuits, lattice networks or a multiple crystal arrangement for obtaining good skirt response about the tuned frequency of the filter. Piezoelectric electrostrictive materials, such as barium titanate and lead-zirconate titanate, have a further disadvantage of high dielectric and mechanical losses and, therefore, are not adaptable to be used as narrow band filters. Magnetostrictive materials, pure annealed nickel for instance, display excellent narrow band characteristics. However, the use of such materials in a magnetic field results in high eddy current losses, with the skirt response also being limited due to the magnetic coupling through the material between input and output circuits. Eddy currents may be reduced by laminating and stacking, but this may induce spurious responses making such materials of little usefulness in narrow band applications. The use of magnetostrictive ferrites causes negligible eddy current and mechanical losses. These properties are very useful in narrow band filter applications. However, because of the high degree of magnetic coupling between the input and output circuits, the usefulness of ferrites is limited; therefore, to provide adequate isolation between input and output, it becomes necessary to use bridge or lattice networks. Electrodynamically driven reeds, because of their narrow range of responsive frequencies, have only restricted usage; and are difficult to use above a few kilocycles.

It would, thus, be highly advantageous if the desirable properties of selected ones of the materials mentioned above could be used in combination without introducing any of the disadvantages associated with the materials as used individually.

It is, therefore, an object of the present invention to provide a new and improved electromechanical filter.

It is a further object of the present invention to provide a new and improved electromechanical filter having good isolation between input and output, with low mechanical and electrical losses being introduced therein.

It is a further object of the present invention to provide a new and improved electromechanical filter having a high input impedance so that a large number of such devices may be easily driven in parallel.

It is a further object of the present invention to provide a new and improved electromechanical filter in which the resonant frequency of the filter may be adjusted.

Broadly, the above cited objects and advantages are accomplished by providing an electromechanical filter in which a vibrating member having a magnetostrictive characteristic is driven by a device having an electrostrictive characteristic, the latter device having applied thereto electrical input signals. An output circuit is coupled to the member to provide output signals in response to being activated by input signals of a predetermined frequency.

These and other objects and advantages of the present invention will become more apparent when considered in view of the following specification and drawing, in which:

The single figure is an isometric diagram of the electromechanical filter of the present invention which is cut away at portions to show the internal structure of the filter.

As used herein, the term electrostrictive is intended to mean such materials or devices having a characteristic whereupon the application of an electrical signal thereto will produce a mechanical output, viz., by the changing of the physical dimensions of the device, and vice versa. This definition will thus include piezoelectric crystals and ceramics which are polarized to exhibit electrostrictive or piezoelectric characteristics. The terms magnetostrictive, as used herein, is intended to mean such a material or device which exhibits the characteristic of having its magnetic properties altered when its physical dimensions are changed, and vice versa.

Referring to the single figure, the electromagnetic filter of the present invention is shown having a magnetostrictive ferrite rod 2 cut to a predetermined length. The rod is designed to vibrate in a longitudinal mode with a node at its center support as will be discussed below. The rod 2 is cylindrical in shape and its length may be determined for a desired frequency from the following equation: $L=V/2f$, where V is the velocity of compressional waves in a thin ferrite rod, and $f$ is the desired frequency.

In the fabrication of the device, the rod 2 is cut to the desired length L. After the ferrite rod has been cut, the frequency may be somewhat altered by grinding away ferrite material at the ends of the rod or by removing some of the material near the center of the rod. The ferrite material of the rod 2 may comprise a nickel-cobalt ferrite material or other material having a magnetostrictive characteristic as discussed above. A ferrite material, of course, has the advantage of substantially no eddy current losses.

An electrostrictive driver element 4 is secured to the magnetostrictive rod 2 at substantially its center nodal point. The driver element may comprise a piezoelectric crystal or polarized ceramic material such as barium titanate or lead-zirconate titanate. The device 4 is secured to the rod 2 by cementing it thereto with, for example, an epoxy. Input signals are applied to the electrostrictive device 4 through a pair of input terminals 6 and 8 and leads 10 and 12 connecting the terminals and the device 4. The input signals should have a component that is of the same frequency as the resonant frequency of the filter in order for there to be an output. When applied to the electrostrictive device 4, these signals will cause the device to change its dimension in response thereto and at the frequency of the input signals. The rod 2 will, in turn, be driven at this frequency by the expansion and contraction of the device 4; and will, thus, be driven to vibrate in a longitudinal mode having a centrally located node where the electrostrictive device 4 is fixed. When the rod 2 is driven at its resonant frequency a much higher amplitude vibration will occur than at other frequencies as is well known.

The rod 2 is mounted at its central portion by a support member 14 which has a substantially annular shape with the rod 2 fitting therethrough. The support member 14 may comprise a plastic material. The rod 2 is held securely, yet compliantly, by the support member 14 through use of a plurality of set screws 16 (only one is shown), each of which engage a nylon ball 18 at the surface of the rod 2. The nylon balls thus provide a relatively compliant connection to the rod 2 at its central nodal point with sufficient strength being maintained by the use of the set screws 16. The support member 14 is secured to a frame 20, which may, for example, comprise steel or other permeable material, by a screw or bolt, not shown. The terminals 6 and 8 are fitted through a portion 21 of the frame member 20 and insulated therefrom by grommets 23 which may comprise Teflon.

To supply a magnetic field to the magnetostrictive rod 2, a bar shaped permanent magnet 22 and a cylindrically shaped permanent magnet 24 are provided. The bar magnet 22 is secured to the frame 20 by, for example, gluing, and may comprise a well known ceramic type magnet. The cylindrically shaped magnet 24 is disposed along the longitudinal axis of the magnetostrictive ferrite rod 2 and is movable along this axis by a fine tuning adjustment screw 26. The magnet 24 is glued to the screw 26. By rotating the adjustment screw 26, the amount of magnetic flux applied to the ferrite rod 2 may be varied for fine tuning of the resonant frequency of the rod.

An insulating sheath member 30 is fitted over the cylindrical magnet 24 and the right portion of the rod 2 through an aperture in the portion 21 of the frame member 20. This sheath 30, for example, may comprise impregnated paper. A relatively good magnetic circuit is then provided through the ferrite rod 2, being supplied by the magnets 22 and 24 and being completed by the frame 20, including the portion 21.

When the magnetostrictive rod 2 is driven by the electrostrictive member 4, the magnetic characteristics of the rod 2 change, i.e. the permeability of the magnetostrictive material will change. This will, in turn, vary the amount of flux passing through the ferrite rod 2 due to its changing permeability with the vibrations.

To detect changes in the magnetic characteristics of the ferrite rod 2, a coil 32 is wound about the sheath member 30 adjacent to the support member 14. The coil 32 is ideally situated as close to the center of the rod 2 as possible at the point where maximum stresses are developed in the rod. The coil, for example, may comprise a plurality of turns of copper wire. The ends of the coil are connected to a pair of terminals 34 and 36 which are insulated from the portion 21 by grommets 38 which may, for example, be of Teflon.

With input signals being applied across the terminals 6 and 8, the electrostrictive crystal 4 will change its physical dimensions in response thereto. Since small electrostrictive devices have a high input impedance, mostly capacitive, a large number of such devices may be driven from a common source without requiring a separate isolation stage for each device or a low impedance driver. The input impedance of an electrostrictive device suitable for use herein may be from 20,000 to 100,000 ohms depending upon the ceramic size. The magnetostrictive ferrite rod 2, being cut to a predetermined length, when input signals of the corresponding frequency are applied across the electrostrictive device 4, the rod 2 will be driven into vibration in a longitudinal mode at its resonant frequency and will vibrate a relatively high amplitude, substantially higher than when off-frequency excitation is provided. Maximum stresses will occur about the nodal center of the rod. As this mechanical stress occurs in the rod its magnetic characteristic will change with the amount of flux from the permanent magnets 22 and 24 passing through the rod also changing. Thus, the amount of flux linking the coil 32 will vary inducing an output current in the coil 32 which will appear at the output terminals 34 and 36. If an output signal appears across the terminals 34 and 36 this indicates that the input signal received at the terminals 6 and 8 contain a component at resonant frequency of the filter.

The rod 2 is shown supported about its center portion by the support member 14, however, other means of support could, of course, be utilized, for instance, a two point support about two precalculated nodal points. However, by using the center of the rod as a single support point, it is not necessary to calculate the nodal points for different lengths of rods, but rather only to determine the center of the rod which greatly simplifies the mounting procedure.

As is well known in the art the resonant frequency of a magnetostrictive rod may be somewhat changed by the amount of magnetic bias applied thereto. The useful change in resonant frequency may be the order of 1/10 of a percent. Thus, a rod designed to have a resonant frequency of 50,000 cycles may be controlled within a 50 cycle range by varying the magnetic bias with no substantial increase in insertion loss. Thus, by use of the fine tuning adjustment screw 26, the cylindrical magnet 24 may be moved closer or farther from the rod 2 and so vary the amount of magnetic bias applied to the rod. This adjustment serves to fine tune the rod to the desired predetermined frequency and thereby greatly increases the tolerances that may be permitted in the manufacture of the device.

The Q of the ferrite rod is relatively high, on the order of 2,000 to 2,500. If such a Q is utilized with a relatively small electrostrictive crystal, the power insertion loss for the filter will be approximately 10 db. Of course, the insertion loss can be improved in each case by tuning out the input capacitance of the electrostrictive device with an appropriate inductance. The insertion loss can also be improved by using a larger sized electrostrictive device because more mechanical energy is applied to the rod. The use of a larger crystal lowers the Q of the rod. Thus, if a crystal is used which reduces the Q of the rod 2 to approximately 1,000, the insertion loss will only be approximately 6 db. Rough tuning of the rod 2 may be accomplished by removing ferrite material at the ends or near the middle of the rod. If material is removed from the ferrite rod at the ends, the frequency of the rod is increased, while removing material nearer to the center of the rod lowers the resonant frequency.

Thus, an electromagnetic filter is provided which is responsive to the very narrow band of frequency about its resonant frequency. The 3 db bandwidth of devices such as described herein has been found to be the order of 20 cycles. Moreover, by the use of such a design, a great number of separate channels may be utilized over a limited frequency spectrum. Furthermore, because of the low insertion losses in the device and high Q relatively high power output signals can be obtained with a given input signal, which improves the performance of the device with a minimum amount of interference from off frequency or spurious input signals.

The filter device is, of course, reciprocal, i.e., a signal of the resonant frequency applied to the coil will result in a voltage of that same frequency which will appear across the electrical terminals of the electrostrictive device.

Although the present invention has been described with a certain degree of particularity it should be understood that the present disclosure has been made only by way of example and that numerous changes in the details of construction and fabrication and the combination and arrangement of parts and elements may be resorted to without departing from the spirit and scope of the present invention.

We claim as our invention:

1. A narrow bandpass electromechanical filter comprising, a substantially cylindrical rod comprising a ferrite magnetostrictive material whose magnetic characteristics change when mechanical stresses are created therein, said magnetostrictive rod having a predetermined length to have a given resonant frequency, a permanent magnet disposed along the longitudinal axis of said rod to supply a magnetic bias thereto, a frame member comprising a magnetic material disposed to provide a magnetic circuit for said rod and said magnet, a support member to mount said rod to said frame member substantially at the center of said rod, an electrostrictive device fixed to said rod substantially at the center thereof, said device having a characteristic so as to provide a mechanical output in responsive to an electrical input being applied thereto, input means to apply electrical signals to said device, said device being operative to drive said rod mechanically in response to said electrical signals, output coil means disposed about said magnetostrictive device and being operative to supply output signals when said input electrical signals are substantially of the resonant frequency of said rod, and adjusting means to move said permanent magnet axially with respect to said rod to vary the magnetic bias applied thereto and provide fine tuning adjustment to a predetermined resonant frequency for said rod.

References Cited

UNITED STATES PATENTS

| | | | |
|---|---|---|---|
| 2,101,272 | 12/1937 | Scott | 333—72 |
| 2,571,019 | 10/1951 | Donley et al. | 333—71 |
| 3,283,270 | 11/1966 | Keller | 333—71 |

ROY LAKE, *Primary Examiner.*

DARWIN R. HOSTETTER, *Examiner.*